(12) United States Patent
Weeter et al.

(10) Patent No.: US 9,249,838 B2
(45) Date of Patent: Feb. 2, 2016

(54) TRANSMISSION CLUTCH WITH IMPROVED COOLING

(75) Inventors: Greg Alan Weeter, Ann Arbor, MI (US); William L. Cousins, Ortonville, MI (US); Shachindra Dongaonkar, Bangalore (IN)

(73) Assignee: GM Global Technology Operations, LLC, Detroit, MI (US)

( * ) Notice: Subject to any disclaimer, the term of this patent is extended or adjusted under 35 U.S.C. 154(b) by 926 days.

(21) Appl. No.: 13/422,805

(22) Filed: Mar. 16, 2012

(65) Prior Publication Data
US 2013/0240319 A1 Sep. 19, 2013

(51) Int. Cl.
*F16D 13/72* (2006.01)

(52) U.S. Cl.
CPC ........ *F16D 13/72* (2013.01); *F16D 2300/0212* (2013.01)

(58) Field of Classification Search
CPC .......................... F16D 2300/0212; F16D 13/72
USPC ............... 192/113.2, 113.22, 113.23, 113.24, 192/113.26
See application file for complete search history.

(56) References Cited

U.S. PATENT DOCUMENTS

| | | | | |
|---|---|---|---|---|
| 1,635,353 A | * | 7/1927 | Alley ........................ | 192/113.23 |
| 4,139,085 A | * | 2/1979 | Kanbe et al. .............. | 192/107 R |
| 4,413,716 A | * | 11/1983 | Newsome et al. ......... | 192/70.12 |
| 4,657,128 A | * | 4/1987 | Fujito et al. .............. | 192/113.24 |
| 5,845,757 A | | 12/1998 | Csonka | |

FOREIGN PATENT DOCUMENTS

| | | | |
|---|---|---|---|
| DE | 10215168 A1 | | 10/2003 |
| DE | 102009002968 A1 | | 11/2010 |
| EP | 1589245 A2 | * | 10/2005 |
| GB | 2097873 A | * | 11/1982 |
| WO | WO9947829 A1 | | 9/1999 |

* cited by examiner

*Primary Examiner* — Robert Hodge
*Assistant Examiner* — Terry Chau

(57) ABSTRACT

A clutch for a manual or automatic transmission according to the present invention includes an axial fan or turbine disposed on a shaft extending between the clutch and the transmission. Air is supplied to the turbine through one or more radial passageways between the clutch and transmission housings and is provided through an annular passageway around the shaft. Air from the annular passageway is then dispersed generally radially between the clutch plates or disks and other clutch components to absorb and carry away heat generated during clutch operation.

19 Claims, 3 Drawing Sheets though the figure shows a typical single plate clutch, it should also be understood, however, that the present invention is equally well suited for use in a multi-plate, multi-disk clutch.

TRANSMISSION CLUTCH WITH IMPROVED COOLING

FIELD

The present disclosure relates to clutches for motor vehicle transmissions and more particularly to clutches for manual or automatic transmissions having improved cooling.

BACKGROUND

The statements in this section merely provide background information related to the present disclosure and may or may not constitute prior art.

Clutches for motor vehicle powertrains provide a frictional, variable torque transmitting coupling between the vehicle prime mover and the transmission. Because of this function, significant heat may be developed in the clutch plates, especially if the vehicle is driven hard or the clutch is operated partially engaged for any period of time. Such worst case operating scenarios, which much be addressed, typically result in a clutch designs that comprehend larger clutch plates, more numerous clutch plates, a larger flywheel, more robust clutch materials (facings) and other design approaches. Such larger clutch components are not solely driven by higher torque requirements but also by operating temperature and heat dissipation considerations. That is, larger clutch plates and faces, while carrying less torque and therefore generating less heat per square unit of measure than smaller clutches, also have the capability of dissipating more heat, more rapidly than smaller clutches, not only because of their larger size but also the larger size of their housings which, in turn, increases the rate at which heat can be transferred to the ambient.

Increasing the size of a clutch, while thus clearly advantageous from heat generation and dissipation viewpoints, is not an engineering solution without serious consequences. First of all, it clearly adversely affects the weight of the clutch and housing and thus the overall weight of the vehicle. In an age when every ounce of removed vehicle weight is considered a small victory, adding several ounces or pounds to a clutch assembly requires the most sound justification. Second of all, increased clutch and housing size affects not only the size of the overall powertrain but also its packaging. Whereas a smaller clutch and housing will permit enhanced packaging flexibility, a larger clutch may create additional constraints. Last of all, increasing the weight of the rotating powertrain components will have a small but tangible effect on the fuel consumption of the associated vehicle as well as its performance.

From the foregoing, it is apparent that approaches to clutch heat dissipation other than simply increasing the size of the clutch may provide better solutions with fewer compromises. The present invention addresses this problem.

SUMMARY

The present invention provides a clutch for a manual or automatic transmission motor vehicle powertrain having improved heat dissipating characteristics. The clutch according to the present invention includes an axial fan or turbine disposed on a shaft extending between the clutch and the transmission. Air is supplied to the turbine through one or more radial passageways between the clutch and transmission housings and is provided to the interior of the clutch through an annular passageway disposed about the transmission input shaft. Air from the annular passageway is then dispersed generally radially between the clutch plates or disks and other clutch components to absorb and carry away heat generated during operation of the clutch.

Thus it is an aspect of the present invention to provide a means for supplying cooling air to the components of a manual or automatic transmission motor vehicle clutch.

It is a further aspect of the present invention to provide an axial fan or turbine which supplies cooling air to the components of a manual or automatic transmission motor vehicle clutch.

It is a still further aspect of the present invention to provide an axial fan or turbine having adjacent radial air passageways which supply cooling air to the components of a manual or automatic transmission motor vehicle clutch.

It is a still further aspect of the present invention to provide an axial fan or turbine which supplies cooling air through an annular passageway to the components of a manual or automatic transmission motor vehicle clutch.

It is a still further aspect of the present invention to provide an axial fan or turbine which supplies cooling air to the clutch plates of a manual or automatic transmission motor vehicle clutch.

It is a still further aspect of the present invention to provide an axial fan or turbine which supplies cooling air to the clutch plates of a manual or automatic transmission motor vehicle clutch to carry heat to the ambient.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
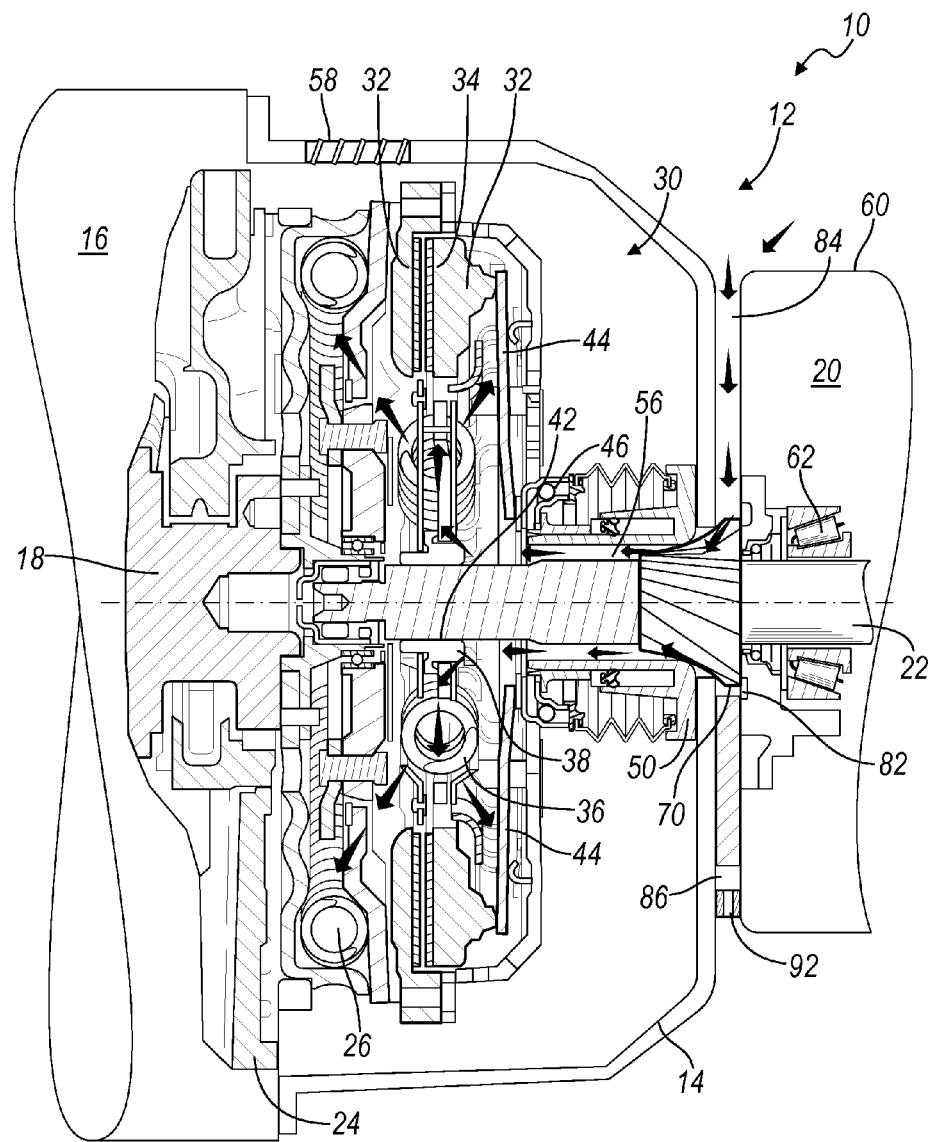
FIG. 1 is a top, full sectional view of a dry transmission clutch incorporating the present invention.

With reference to FIG. 1, a portion of a motor vehicle powertrain is illustrated and generally designated by the number 10. The motor vehicle powertrain 10 includes a clutch assembly 12 which includes a typically cast exterior metal housing 14 which locates, secures and protects the various components of the clutch assembly 12. The clutch assembly 12 is supplied with drive torque from a prime mover 16 such as a gasoline, Diesel, flex fuel or hybrid power plant by a crankshaft/clutch input member 18 and supplies drive torque to a transmission 20 through a transmission input (clutch output) shaft 22. It should be understood that the transmission 20 with which the present invention is utilized may be either a manual transmission or an automatic transmission, for example, a dual clutch transmission (DCT). The clutch input member 18 is coupled to and drives a conventional dual mass flywheel 24 and a spring damper assembly 26 which, in turn, drives a dry manual clutch 30. It should be understood that while the dry clutch 30 is herein characterized as a manual clutch, it may either be a manual (directly operator controlled) clutch or a clutch controlled by a hydraulic, pneumatic or electric actuator.

The dry manual clutch 30 includes a pair of input side or first clutch plates or disks 32 which are disposed on opposite sides of and in operating, i.e., selective torque transferring, relationship with an output side or second, double sided clutch plate or disk 34. A plurality of shock absorbing isolator springs 36 are disposed in an isolator plate 38 between the output side clutch plate or disc 34 and the transmission input (clutch output) shaft 22. The isolator plate 38 is preferably coupled to the transmission input shaft 22 by a set of interengaging splines 42.

The dry manual clutch 30 also includes a plurality of first class levers 44 that extend between a clutch release bearing 46 and one of the pair of input side clutch plates or disks 32 and transmit axial clutch engaging and releasing motion therebetween. The clutch release bearing 46 is supported on a collar or hub 50 that is disposed concentrically about the transmission input shaft 22 and secured to the cast metal housing 14 by a plurality of suitable fasteners (not illustrated). The collar or hub 50 defines an annular air inlet passageway 56 between its inside surface and the outside surface of the transmission input shaft 22. The top of the housing 14 of the clutch assembly 12 includes and defines an air exit or exhaust port or passageway 58 which allows air from the interior of the clutch assembly 12 to flow to the outside of the housing 14 and thereby carry heat from the interior of the clutch assembly 12 to the ambient.

Figure 2:
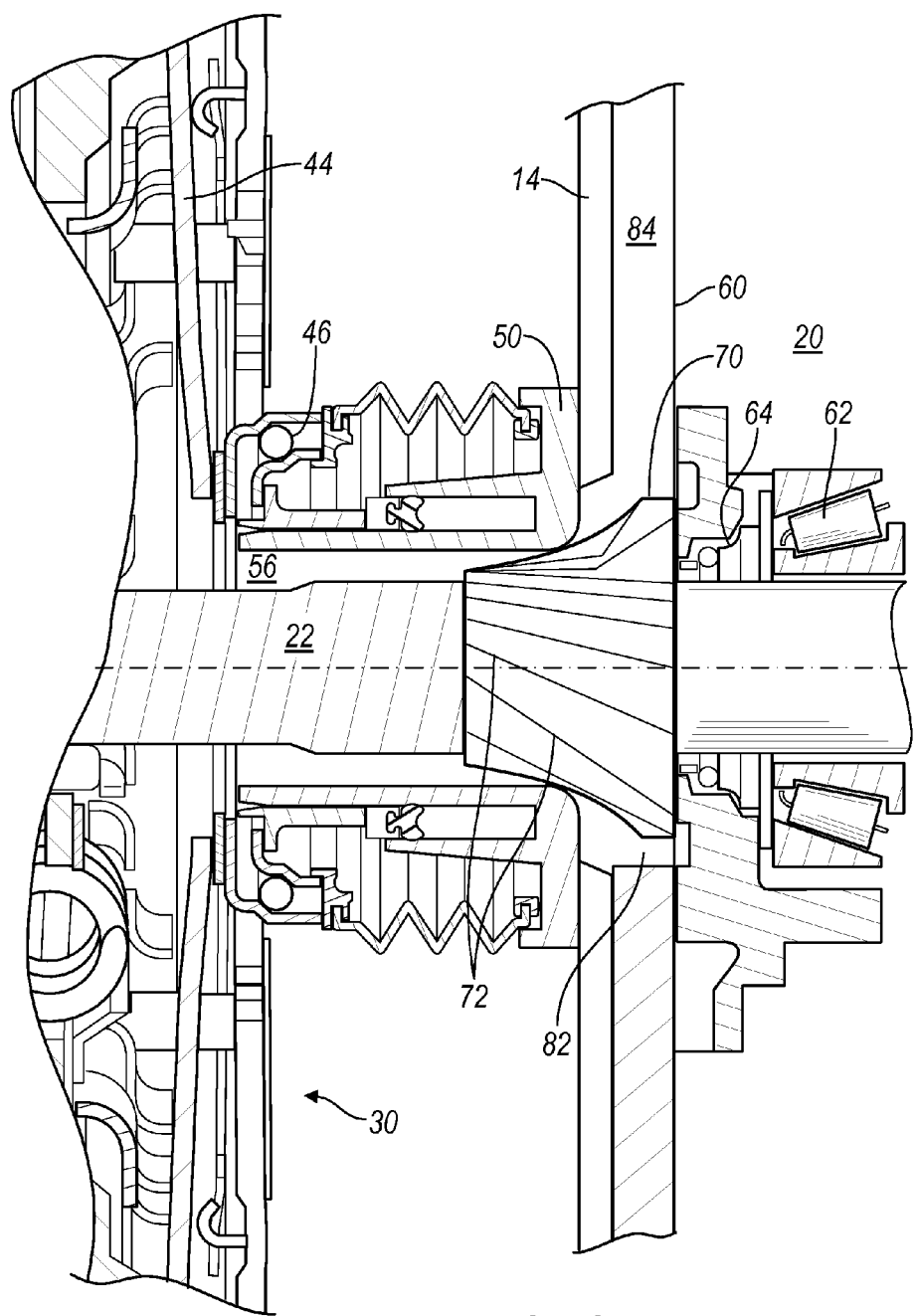
FIG. 2 is an enlarged sectional view of the turbine according to the present invention.

As illustrated in FIG. 2, the transmission input shaft 22 extends into a transmission housing 60 where it is supported for rotation on an anti-friction roller bearing assembly 62. An oil seal 64 disposed between the transmission input shaft 22 and the transmission housing 60 provides a fluid tight seal therebetween.

Integrally formed with the transmission input shaft 22 or secured thereto by an interference fit or other mechanical means such as flats, splines, keys and keyways, one or more set screws, or a combination thereof, is a fan or turbine 70. The fan or turbine 70 includes blades or vanes 72 that are configured to draw air in at its base and deliver it axially under low pressure to the annular passageway 56 when the transmission input shaft 22 rotates in a direction corresponding to forward motion of the associated vehicle. When viewed from behind the clutch assembly 12, that is, the right in FIG. 2, the typical transmission input shaft 22 will rotate counter-clockwise when the associated vehicle is moving forward and thus the blades or vanes 72 are configured as illustrated in FIG. 2, drawing air in at the base of the fan or turbine 70 as it rotates counter-clockwise and discharging air axially into the annular passageway 56. Note the arrows in FIG. 1 which illustrate such air flow.

Figure 3:
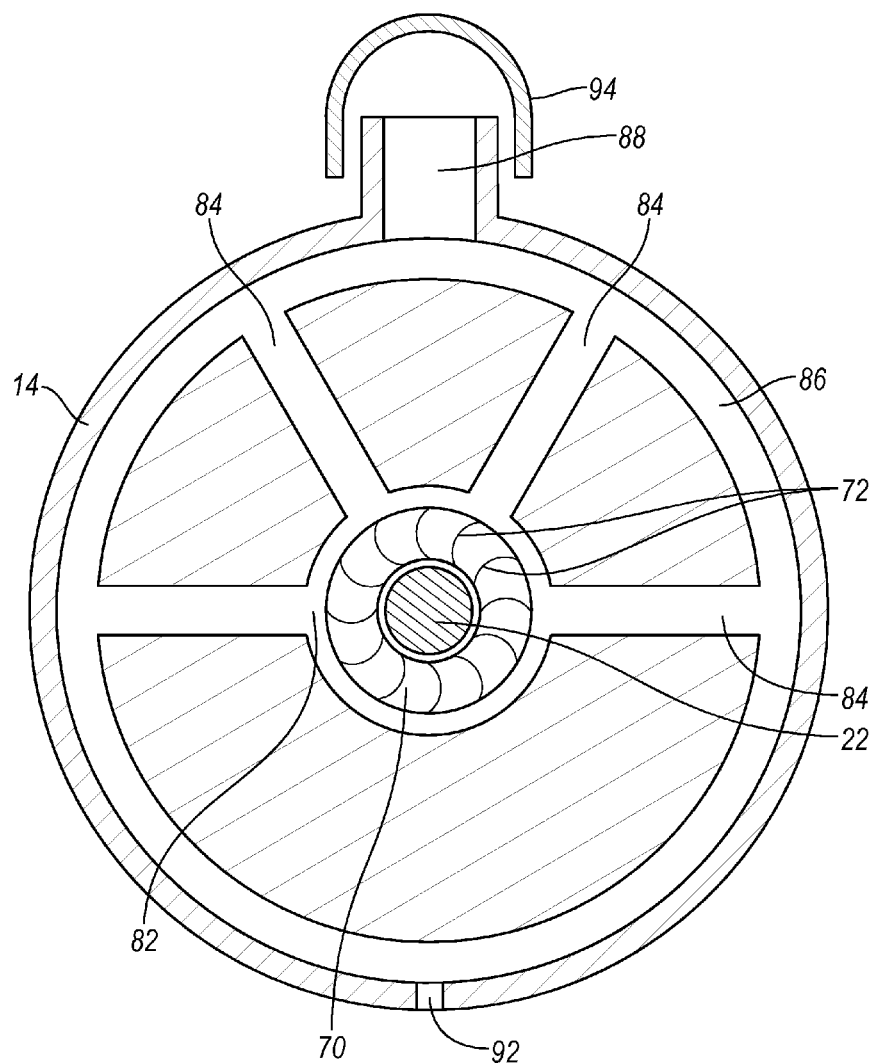
FIG. 3 is a full sectional view of a dry transmission clutch incorporating the present invention taken through the inlet passageways.

Referring now to FIG. 3, the exterior clutch housing 14 defines a center circular chamber 82 that receives the fan or turbine 70 disposed on the transmission input shaft 22. Communicating with the circular chamber 82 are a plurality of preferably radial passageways 84. The radial passageways 84 may be two, three, four or more in number and are preferably arranged at and above the horizontal midpoint of the exterior clutch housing 14 as illustrated in FIG. 3. The radial passageways 84 merge and communicate with a circumferential passageway 86 having an air inlet port or opening 88 generally disposed at the top (12 o'clock) of the exterior clutch housing 14.

The lower portion of the circumferential passageway 86 may be closed off or, optionally, may include a small bleed hole 92 which functions as a drain. The air inlet port or opening 88 is preferably covered by a cap or diverter 94. It will be appreciated that the radial and circumferential passageways 84 and 86 and the air inlet port 88 may also be formed in the face of the transmission housing 60. Thus, as the transmission input shaft 22 rotates and the associated motor vehicle moves, ambient air is drawn in through the inlet port or opening 88, through the circumferential passageway 86 and through the radial passageways 84 to the fan or turbine 70. Air under low pressure is then forced along the annular passageway 56 and generally into the interior of the dry manual clutch 30. The air then disperses and flows over and through the dry manual clutch 30 and the associated components such as the flywheel 24, carrying away heat to the ambient.

It will be appreciated that the cooling fan or turbine 70 of the present invention reduces the operating temperature of the dry manual clutch 30 and the dual mass flywheel 24. As noted above, this permits a reduction in the size of the clutch 30 and the flywheel 24 and thus also their weight. Since these are rotating components, weight reduction not only reduces vehicle weight but also rotating inertia and thus improves vehicle performance. Such cooling also reduces the operating temperature of the clutch hydraulic fluid which reduces the friction and hysteresis of the apply system.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch assembly for a transmission having improved cooling comprising, in combination,
    a clutch including at least a pair of spaced apart input clutch disks and an output clutch disk disposed between said input clutch disks,
    a transmission input shaft operably coupled to and driven by said output clutch disk,
    a stationary collar disposed about said transmission input shaft, said collar having an inside surface and defining an annular passageway between said surface and said input shaft,
    an air turbine secured to said transmission input shaft and having a plurality of vanes having a larger diameter portion outside said annular passageway configured to draw air radially in and a smaller diameter portion inside said annular passageway configured to direct air axially along said annular passageway, and
    a plurality of radial passageways communicating with said larger diameter portion of said air turbine.

2. The clutch assembly for the transmission of claim 1 further including a circumferential passageway merging with said radial passageways.

3. The clutch assembly for the transmission of claim 2 further including an inlet opening communicating with said circumferential passageway.

4. The clutch assembly for the transmission of claim 1 further including a spring isolator operably disposed between said output clutch disk and said transmission input shaft.

5. The clutch assembly for the transmission of claim 1 wherein said air turbine is integral to said transmission input shaft.

6. The clutch assembly for the transmission of claim 1 wherein said air turbine is a component secured to said transmission input shaft.

7. The clutch assembly for the transmission of claim 1 further including a clutch release bearing disposed on said collar.

8. A clutch assembly for a manual transmission having improved cooling comprising, in combination,
   an input member,
   a clutch including at least a pair of spaced apart input clutch disks and an output clutch disk disposed between said input clutch disks,
   a transmission input shaft operably coupled to and driven by said output clutch disk,
   a stationary collar disposed about said transmission input shaft, having an inside surface and defining a passageway between said inside surface and said transmission input shaft,
   an air turbine secured to said transmission input shaft and having a larger diameter input end disposed outside said passageway and a smaller diameter output end disposed inside said passageway, and
   a plurality of inlet passageways communicating with said larger input end of said air turbine.

9. The clutch assembly for the transmission of claim 8 further including a spline set disposed between said output clutch disk and said transmission input shaft.

10. The clutch assembly for the transmission of claim 8 further including a spring isolator operably disposed between said output clutch disk and said transmission input shaft.

11. The clutch assembly for the transmission of claim 8 wherein said air turbine is integrally formed with said transmission input shaft.

12. The clutch assembly for the transmission of claim 8 wherein said air turbine is a component secured to said transmission input shaft.

13. The clutch assembly for the transmission of claim 8 further including a clutch release bearing disposed on said collar.

14. The clutch assembly for the transmission of claim 8 wherein said plurality of passageways include both radial and circumferential passageways.

15. The clutch assembly of claim 8 wherein said transmission is one of a manual and an automatic transmission.

16. A clutch assembly for a manual transmission having improved cooling comprising, in combination,
   a housing,
   a clutch including an input member, a flywheel coupled to said input member, a pair of spaced apart input clutch disks, an output clutch disk disposed between said input clutch disks,
   a transmission input shaft operably coupled to and driven by said output clutch disk,
   a collar secured to said housing, having an inner surface, disposed concentrically about said transmission input shaft and defining an annular passageway between said transmission input shaft and said inner surface of said collar,
   a plurality of passageways extending toward said input shaft,
   an air turbine secured to said transmission input shaft, said air turbine having a base end disposed outside said annular passageway in fluid communication with said passageways and an output end disposed within said annular passageway directing air flow along said annular passageway.

17. The clutch assembly for the transmission of claim 16 wherein said plurality of passageways are radially oriented and are disposed in said housing.

18. The clutch assembly for the transmission of claim 16 further including a clutch release bearing disposed on said collar.

19. The clutch assembly of claim 16 further including a plurality of passageways communicating with said air turbine from outside said housing.

* * * * *